United States Patent [19]

Tejima et al.

[11] Patent Number: 4,936,657
[45] Date of Patent: Jun. 26, 1990

[54] PROJECTION TYPE LIQUID-CRYSTAL VIDEO DISPLAY DEVICE USING A FRESNEL LENS

[75] Inventors: Yasuyuki Tejima; Ryota Ogawa, both of Tokyo, Japan

[73] Assignees: Asahi Kogaku Kogyo Kabushiki Kaisha; Casio Computer Co., Ltd., both of Tokyo, Japan

[21] Appl. No.: 886,852

[22] Filed: Jul. 18, 1986

[30] Foreign Application Priority Data

Jul. 18, 1985 [JP] Japan .................................. 60-159239

[51] Int. Cl.$^5$ .......................... G02F 1/13; G02F 1/126
[52] U.S. Cl. ................................. 350/331 R; 350/345; 350/452; 353/102; 353/122
[58] Field of Search ............... 350/331 R, 347 V, 452, 350/286, 345; 353/122.70, 102, 119

[56] References Cited

U.S. PATENT DOCUMENTS

| | | | |
|---|---|---|---|
| 3,064,523 | 11/1962 | Meltzer | 350/286 |
| 3,750,136 | 7/1973 | Roess | 350/331 R |
| 3,764,211 | 10/1973 | Morse et al. | 350/342 |
| 3,844,650 | 10/1974 | Nicholson et al. | 353/102 |
| 3,887,791 | 6/1975 | Kitchens | 350/112 |
| 4,012,136 | 3/1977 | De la Croix et al. | 353/102 |
| 4,256,405 | 3/1981 | Fjarlie | 350/331 R |
| 4,372,639 | 2/1983 | Johnson | 350/331 R |
| 4,436,392 | 3/1984 | Vanderwerf | 353/102 |
| 4,601,545 | 7/1986 | Kern | 350/331 R |
| 4,613,207 | 9/1986 | Fergason | 350/331 R |
| 4,671,634 | 6/1987 | Kizaki et al. | 353/122 |
| 4,722,593 | 2/1988 | Shimazaki | 350/331 R |
| 4,756,604 | 7/1988 | Nakatsuka et al. | 350/331 R |
| 4,770,525 | 9/1988 | Umeda et al. | 353/122 |
| 4,824,210 | 4/1989 | Shimazaki | 350/331 R |
| 4,832,461 | 5/1989 | Yamagishi et al. | 353/122 |

FOREIGN PATENT DOCUMENTS

| | | |
|---|---|---|
| 0127701 | 12/1984 | European Pat. Off. . |
| 2620015 | 11/1977 | Fed. Rep. of Germany . |
| 0153917 | 12/1980 | Japan .................................. 350/452 |
| 0016101 | 2/1981 | Japan .................................. 350/452 |
| 0054902 | 4/1982 | Japan .................................. 350/452 |
| 0129705 | 7/1985 | Japan .................................. 350/452 |

OTHER PUBLICATIONS

J. Neumann—"Fresnelkondensoren"—BILD UND TON—Feb. 1979—32nd Annual Edition—pp. 49-54.
Jenkins and White—"Fundamentals of Optics" McGraw-Hill Book Company, Inc.—Second Edition—1950—pp. 94-111.
Erwin Delano—"Primary Aberrations of Fresnel Lenses" pp. 459-468—Journal of Optical Society of America—vol. 64, No. 4—1974.
L. W. James—"Fresnel Optics—. . . on Photovoltaic cells" pp. 673-679—Conference=13th IEEE Photovoltaic Specialists Conference—1978.
E. M. Kritchman—"Linear Fresnel Lens with Polar Tracking", pp. 1234-1239—Applied Optics—vol. 20, No. 7—Apr. 1981.

Primary Examiner—Stanley D. Miller
Assistant Examiner—Tai Van Duong
Attorney, Agent, or Firm—Sughrue, Mion, Zinn, Macpeak & Seas

[57] ABSTRACT

A projection-type liquid-crystal display in which a Fresnel lens in placed on the exit side of the liquid crystal panel to focus the image toward a projection lens. Preferably, the Fresnel lens has a non-symmetric pattern so as to efficiently gather light propagating through the display panel at an oblique angle coinciding with a reorientation angle of the liquid crystal. Additional optics on the incident side of the panel, perhaps including another non-symmetric Fresnel lens, collimates the light at the oblique angle.

25 Claims, 8 Drawing Sheets

PROJECTION TYPE LIQUID-CRYSTAL VIDEO DISPLAY DEVICE USING A FRESNEL LENS

BACKGROUND OF THE INVENTION

1. Field of the Invention

The present invention relates to an improvement of the projection type liquid-crystal video display device.

2. Background Art

As is well-known, a liquid-crystal display panel may be composed of a nematic liquid-crystal cell sandwiched between a pair of parallel light polarizers. The display panel will block incident light when no voltage is applied and will transmit the light when a proper voltage is applied. The long axes of liquid-crystal molecules are reoriented in a direction perpendicular to the electrodes under an applied electric field and maximum display effect is attained when the perpendicular orientation of the long axes is perfect. In fact, however, the voltage that can be applied is limited and the long axes of liquid-crystal molecules will not be reoriented to be completely perpendicular to the electrodes but are somewhat inclined with respect to the electrodes.

This means that the quantity of light that is transmitted through the liquid crystal display panel and then travels toward the eyes of the viewer of the panel will depend on the angle of incidence of illuminating light with respect to the panel and will also depend on the angle of the line of sight of the viewer. In other words, the image contrast or its aesthetic appeal will greatly vary with the angle of re-orientation of liquid-crystal molecules and the angle at which the viewer looks at the display panel.

One method for allowing the illuminating light to be transmitted through the liquid-crystal display panel in an efficient manner would be to allow parallel rays of light to fall not perpendicularly with respect to the panel but parallel to the inclination of the reoriented long axes of liquid-crystal molecules. This method will attain maximum light transmittance through the display panel but the problem that contrast is dependent on the viewing angle still remains. Furthermore, no sharp image can be obtained on the display panel if it is viewed at a perpendicular angle.

The common projection type video display device commercially available today is a video projector which projects a CRT display onto a screen through a projection lens system which has a relatively small aperture ratio of f/1.3 or f/1.0 with an approximate focal length of 100 mm. Small aperture-ratio projection lens systems known today are typically composed of six lens units each consisting of a single glass lens element or three lens units, two of which consist of two single non-spherical plastic lenses and the last one consisting of a single glass lens element. However, both types of projection lens system have the disadvantage of expensive optical material and high fabrication costs which contribute to an increase in the overall cost of the display device.

In the conventional video projector, the CRT serves as a light emitter for projecting the image onto a screen through the projection lens system. On the other hand, the liquid-crystal display panel requires a separate source of illumination light. Furthermore, light which is parallel to the inclination of the re-orientated long axes of the liquid-crystal molecules will be transmitted through the panel most efficiently.

Figure 1:
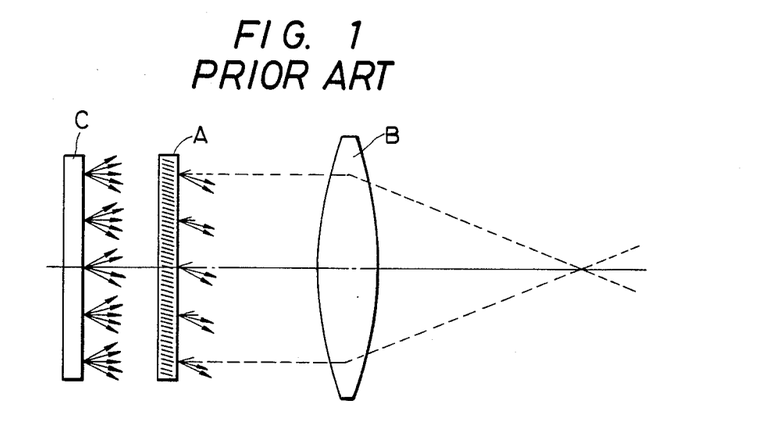
FIGS. 1-5 illustrate prior art projection type liquid-crystal video display devices.
Figure 2:
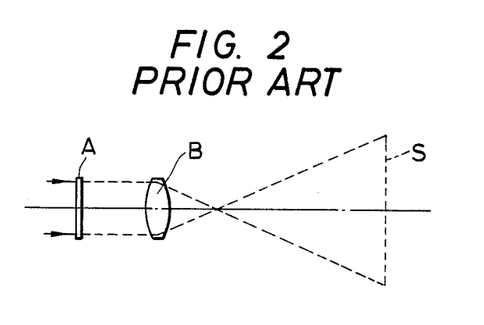
Figure 3:
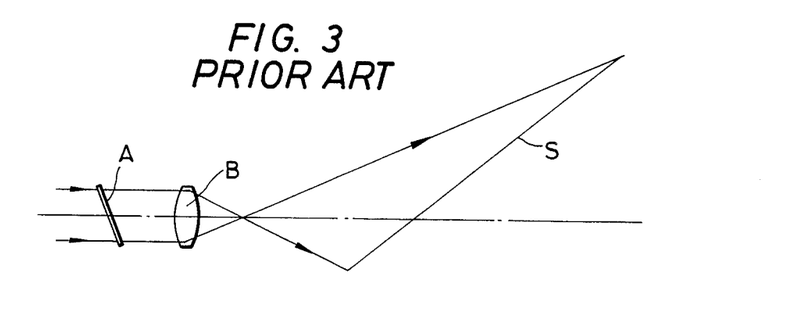

If, as shown in FIG. 1, the liquid-crystal display panel A is disposed such that its center is in alignment with and perpendicular to the optical axis of a projection lens B, the viewing angle and effective aperture of the lens B need to cover the dimensions of the display panel A. However, the display panel A cannot be made smaller than a diagonal dimension of about 3.0 inches. If the projection lens B has a focal distance of 100 mm, an aperture ratio of f/1.3 is necessary to attain a magnification of 20 on the screen S. This means that the effective aperture of the projection lens B is as large as the one required for the conventional video projector. However, the light source C is usually divergent and not much of the light transmitting through the display panel A is parallel to the optical axis of the projection lens B. As a result, the amount of effective light which falls upon the lens B is too small to form a sharp image on the screen S, as shown in FIG. 2. In order to increase the amount of light which falls upon the projection lens B, a tilted optical system may be used which, as shown in FIG. 3, has the display panel A inclined with respect to the projection lens B. If the panel A is tilted in such a manner that the liquid-crystal molecules will be reoriented parallel to the optical axis, the light transmitted through the panel A may efficiently fall on the projection lens B. However, the screen S is also inclined with respect to the optical axis and a trapezoidal image will be formed on the screen.

Figure 4:
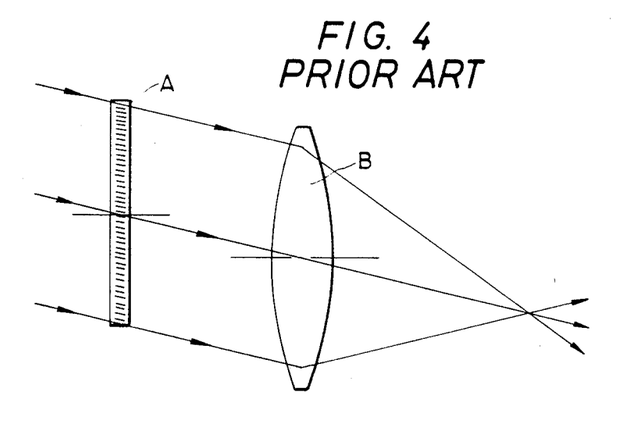
Figure 5:
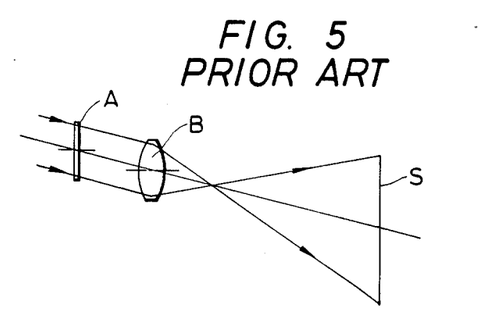

An alternative method for increasing the amount of light falling upon the projection lens B is to use a shifted optical system which, as shown in FIG. 4, has the center of the display panel A offset from the optical axis of the projection lens B. In this system, light falls obliquely on the display panel A and is transmitted efficiently therethrough to fall upon the projection lens B. Unlike the tilted system, the screen S is not inclined, as shown in FIG. 5, and the image formed is not trapezoidal but, on the other hand, the viewing angle of the projection lens B will be increased.

Suppose, for example, the case where the image on a liquid-crystal display panel having a diagonal dimension of 3 inches (46 mm × 61 mm) is projected on the screen at a magnification of 20 through a projection lens having a focal length of 100 mm. In an unshifted state, the viewing angle needs to cover 3 inches (77 mm), or the diagonal dimension of the display panel. However, if light from the display panel makes an angle of 15° with the optical axis, the amount of shift is 26.8 mm and the viewing angle has to cover 4.7 inches (120 mm). This leads to the need to use an expensive projection lens which not only has a large effective aperture for receiving the light from the display panel but also provides a large angle of view.

SUMMARY OF THE INVENTION

Accordingly, an object of the invention is to provide a projection type liquid-crystal display which efficiently uses light.

Another object of the invention is to provide such a display which uses a small projection lens which producing rectangular displays.

Yet a further object of the invention is to provide such a display which provides sharp images by accounting for the reorientation angle of the nematic crystals.

The present invention provides a projection type liquid-crystal video display device which allows illuminating light transmitted through a liquid-crystal display panel to be refracted, in a direction substantially perpendicular to the display panel, and to be focused at a point in the vicinity of the entrance pupil of a projecting optical system. This arrangement permits the use of a projecting optical system having a small viewing angle and a small aperture while enabling not only efficient utilization of the illuminating light but also easy access of the display to the viewer.

The present invention further provides a projection type liquid-crystal video display device which is based on the above summarized device and which allows the illumination from a light source to fall upon the liquid-crystal display panel at an angle which is substantially parallel to the inclination of reorientation of the long axes of liquid-crystal molecules. This device has the advantage of enabling even more efficient utilization of the illuminating light and easy viewer access to the display.

DETAILED DESCRIPTION OF THE PREFERRED EMBODIMENTS

Several of the embodiments of the present invention are hereunder described with reference to the accompanying drawings.

FIGS. 6 through 19 show three embodiments of a projection type liquid-crystal video display device. All three embodiments consist of a source of illuminating light (not shown but positioned on the left), a nematic liquid-crystal display panel 1 for transmitting the illumination from the light source, a projection lens 2 for projecting the light transmitted through the display panel 1 onto a screen (not shown but positioned on the right). Most importantly, an optical element 3 is disposed on the exit side of the display panel 1. The optical element 3 has an optical effect by which the illuminating light through the display panel 1 is refracted from an inclined direction on the left of the display panel 1 to converge and be concentrated at a point perpendicular to the optical element in the vicinity of the entrance pupil of the projection lens 2 lying on the central axis of the refracted light. The illuminating light, having passed through the display panel 1 and having been focused, is allowed to fall on the pupil of the projection lens 2. The entrance pupil is defined as the image of the aperture stop formed by the optical elements between the aperture stop and the object. It amounts to the image of the aperture stop as seen by the object. This well known term is more completely described in "Fundamentals of Optics" 4th ed. by Jenkins and White (McGraw-Hill, 1984). The aperture stop limits the field of view and may be a separate stop or the lateral extent of the lens 2.

Figure 6:
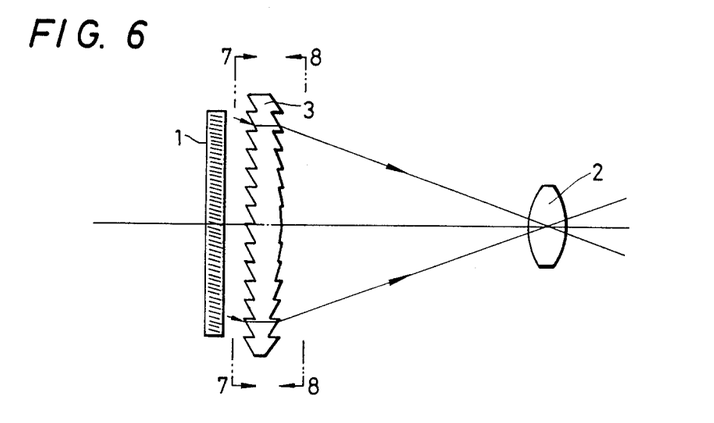
FIG. 6 shows one embodiment of the display device of the present invention wherein an optical element is disposed on the exit side of a liquid-crystal display panel.
Figures 7, 9:
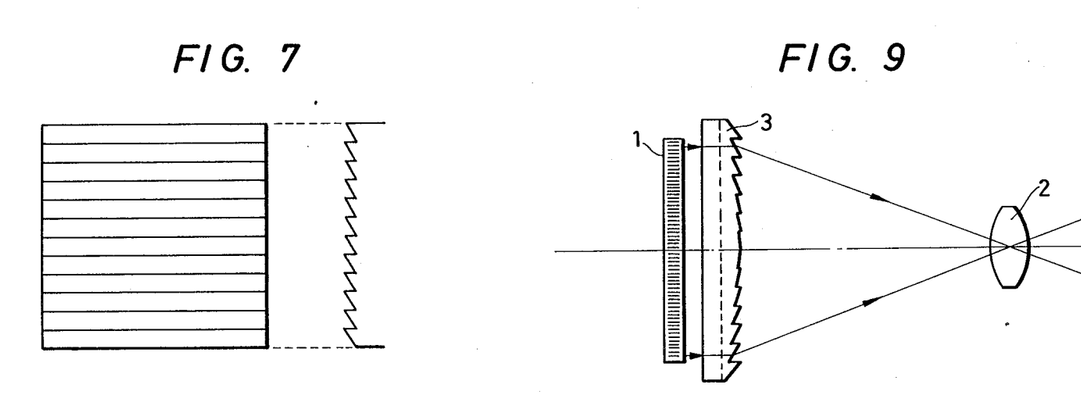
FIGS. 7 and 8 illustrate the configuration of the optical element shown in FIG. 6.
FIGS. 9 and 10 show another embodiment of the display device of the present invention wherein an optical element is disposed on the exit side of a liquid-crystal display panel, with FIG. 9 being a sectional view taken in the horizontal direction and FIG. 10 one taken in the vertical direction.
Figures 8, 10:
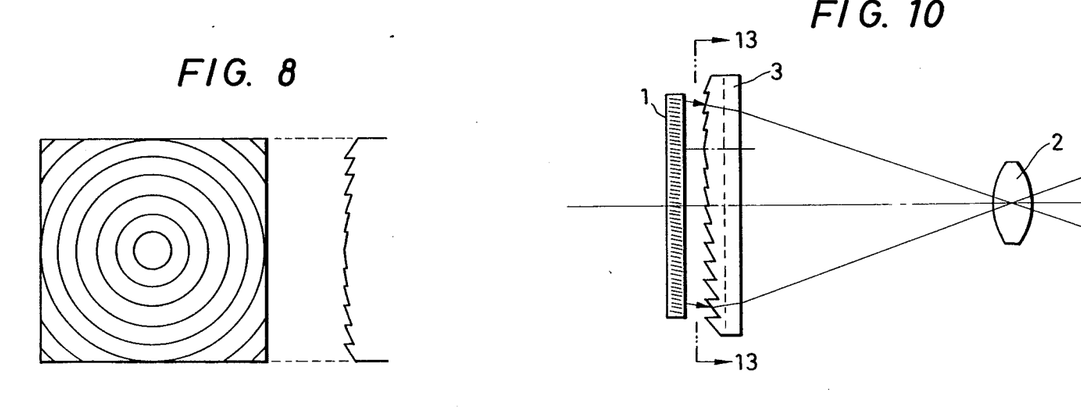

In order to refract the illuminating light, which is transmitted substantially perpendicularly through the display panel 1, to a common focus, the optical element 3 shown in FIG. 6 has one of its surfaces facing the display panel side formed as a stepped prism surface which, as shown in FIG. 7 has parallel grooves and acts as a prism. The illumination side of the optical element 3 comprises a plurality of small prisms having a saw-toothed cross section in order to allow the illuminating light transmitted through the display panel 1 to be concentrated at a point in the vicinity of the entrance pupil of the projection lens 2. The other surface of the optical element 3 on the side of the projection lens is formed, as shown in FIG. 8, as a circular Fresnel lens surface which has concentric grooves and provides a converging effect by means of a plurality of circular, varying height prisms having an irregular saw-toothed diametric cross section. The optical element 3 having such surfaces can be mass produced by compression or injection molding of plastics with a mold cavity fabricated with a numerically controlled lathe.

The stepped prism and the circular Fresnel lens may be integral as shown in FIG. 6 or they may be fabricated separately. Whichever the case, the two components are preferably used in close proximity to the liquid-crystal display panel 1. In the embodiment shown in FIG. 6, a Moire pattern will be formed as a result of close positioning of the stepped prism surface and the circular Fresnel lens surface but this effect may be blurred by properly adjusting the depth of focus of the projection lens 2. The circular Fresnel lens surface, shown in FIG. 8, is typically formed with a spherical curve being used as the base. By a spherical base is meant that the exposed surfaces of the Fresnel lens are not planar but instead follow a spherical shape. The effect is a segmented spherical lens surface. However, in order to allow an image of the light source to fall on the entrance pupil of the projection lens 2 in an efficient manner with a minimum amount of aberration, a non-spherical curve is preferably used as the base. Non-spherical, or more precisely aspherical, lens surfaces are well known for conventional smoothly varying lenses.

The optical element 3 shown in FIG. 9 and 10 is an orthogonal or crossed linear Fresnel lens (shown horizontally in FIG. 9 and vertically in FIG. 10). Two linear Fresnel lens surfaces are fabricated from two cylinder lenses. Each cylinder lenses has straight parallel grooves and provides a unidirectional converging action by a plurality of small prisms having a saw-toothed cross section. The two cylinder lenses are disposed on opposite sides of the optical element in such a manner that grooved surfaces face outward and the grooves of one cylinder lens run perpendicularly to those of the other.

Figure 11:
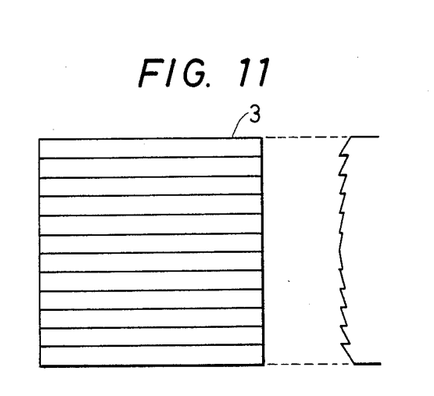
FIGS. 11, 12 and 13, illustrate the configuration of the optical element shown in FIGS. 9 and 10.
Figure 12:
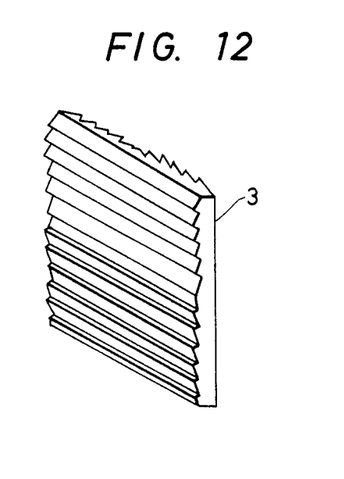
Figure 13:
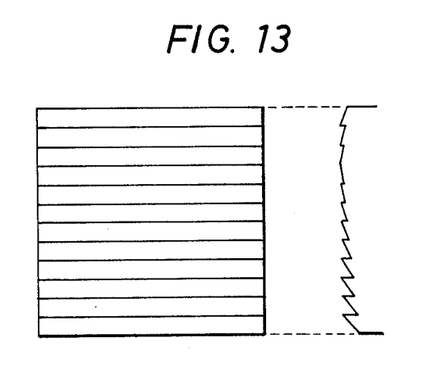

In FIGS. 11 and 12 is shown an optical element 3 which has been modified so that the horizontal grooves are symmetrical about the center. However in the embodiment of FIGS. 9 and 10, the horizontal grooves are non-symmetric. This offset center in the vertical direction, shown plainly in FIG. 13, allows the incident light that is oblique with respect to the optical axis of the projection lens 2 to be concentrated on the optical axis That is, Fresnel lens surfaces having refractive power in the vertical direction with respect to the display panel 1 are employed as eccentric linear Fresnel lenses surfaces. As a result, the light emerging from the display panel 1 in a direction parallel to the inclination of the reorientation of the long axes of liquid-crystal molecules is refracted in a direction perpendicular to the display panel 1.

Figure 14:
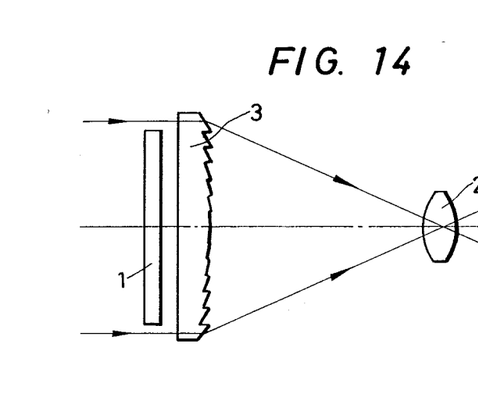
FIGS. 14 and 15 illustrate how illuminating light is concentrated by the optical element shown in FIGS. 9 and 10, with FIG. 14 being a sectional view taken in the horizontal direction and FIG. 15 one taken in the vertical direction.
Figure 15:
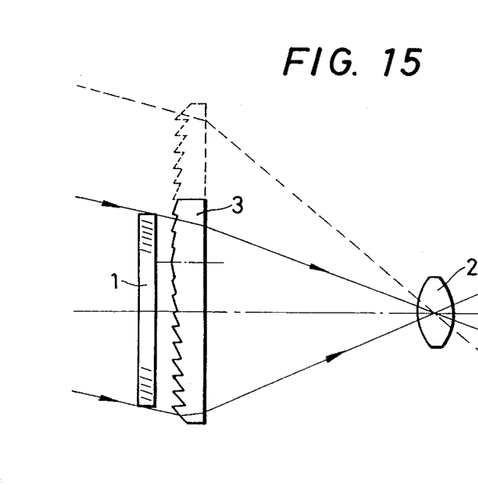

As shown in FIGS. 14 and 15, when illuminating light falls on the orthogonal or crossed linear Fresnel lens obliquely in the vertical direction, the rays of light in the vertical direction are concentrated by the eccentric linear Fresnel lens surface having a vertical refractive power whereas the rays of light in the horizontal direction are concentrated by the linear Fresnel lens surface having a horizontal refractive power. As shown in FIG. 15, the illuminating light in the vertical direction is concentrated at an off-axis focus by the eccentric linear Fresnel lens surface If the center of the display panel 1 is brought into alignment with the optical axis of the projection lens 2 (the lens axis is the line perpendicular to the orthogonal linear Fresnel lens as drawn from the off-axis focus position), and if the display panel 1 is disposed perpendicularly with respect to the optical axis of the projection lens 2, the light transmitted through the display panel 1 will be concentrated on the optical axis in the vicinity of the entrance pupil of the projection lens 2. As a result, the luminous flux which covers the display panel 1 will suffice as the illuminating light. As in the case of the embodiment shown in FIG. 6, the linear Fresnel lens surface may be fabricated with either a spherical or nonspherical curve being used as the base. In the embodiment shown in FIGS. 9 through 15, no Moire pattern will be formed since the grooves on one Fresnel surface intersect those on the other at right angles.

Figure 16:
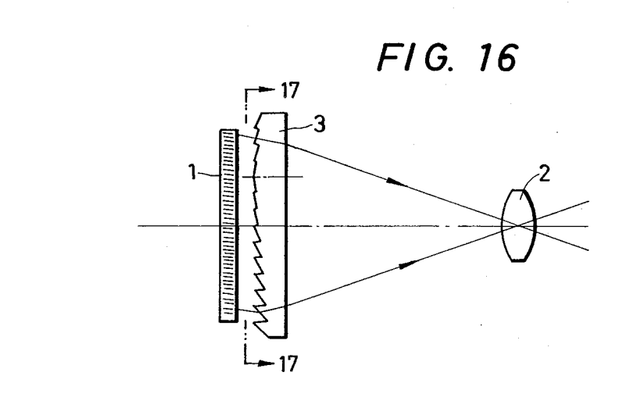
FIG. 16 shows still another embodiment of the display device of the present invention wherein an optical element is disposed on the exit side of a liquid-crystal display panel.
Figure 17:
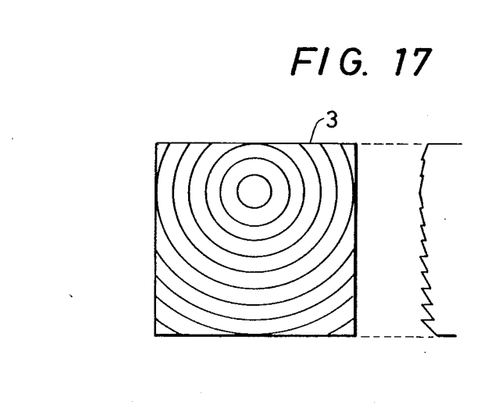
FIG. 17 illustrates the configuration of the optical element shown in FIG. 16.
Figure 18:
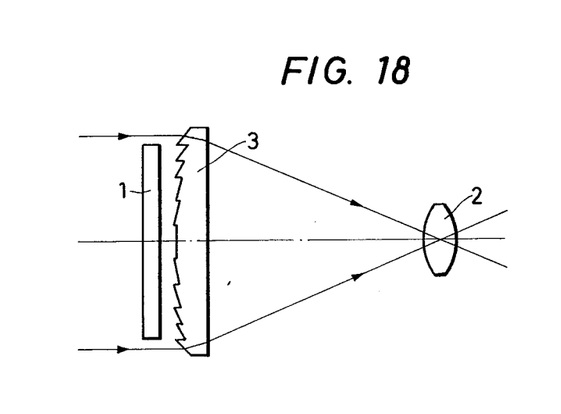
FIGS. 18 and 19 illustrate how illuminating light is concentrated by the optical element shown in FIG. 16, with FIG. 18 being a sectional view taken in the horizontal direction and FIG. 19 one taken in the vertical direction.
Figure 19:
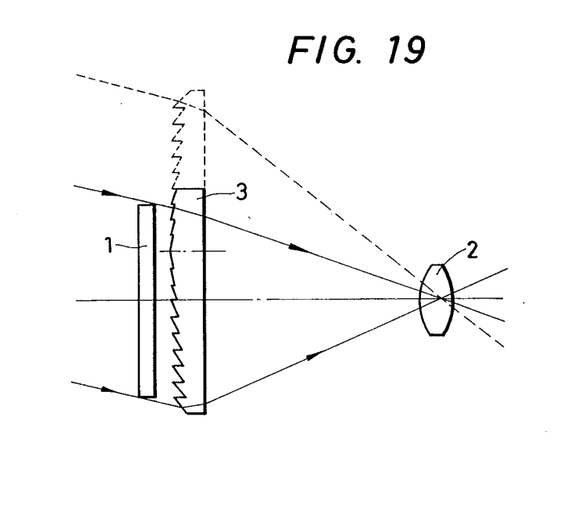

The optical element 3 used in the embodiment shown in FIG. 16 has on one side a circular Fresnel lens of the same type as described in connection with the embodiment shown in FIG. 6 and has a planar surface on the other side. The circular Fresnel lens surface is formed of an eccentric circular Fresnel lens (FIG. 17) by which the light emerging from the liquid-crystal display panel in a direction parallel to the inclination of the reorientation of the long axes of liquid-crystal molecules is refracted to a point perpendicular to the physical center of the optical element 3. In accordance with this embodiment, illuminating light which falls on the eccentric circular Fresnel lens obliquely as shown in FIGS. 18 and 19 is concentrated by the eccentric circular Fresnel lens surface having refractive power in both vertical and horizontal directions. As shown in FIG. 19 for the vertical direction, the light is concentrated on an off-axis focus. If the center of the display panel 1 is brought into alignment with the optical axis of the projection lens 2 which is the line perpendicular to the eccentric circular Fresnel lens as drawn from the off-axis focus position, and if the display panel 1 is disposed perpendicularly with respect to the optical axis of the projection lens 2, the light transmitted through the display panel 1 will be concentrated on the optical axis in the vicinity of the entrance pupil of the projection lens 2. Thus, a luminous flux which covers the display panel 1 will suffice as the illuminating light. As in the case of the embodiment shown in FIG. 6, the Fresnel lens surface of the eccentric circular Fresnel lens may be fabricated with either a spherical or non-spherical curve being used as the base. The optical element 3 used in the embodiment described above has the advantage that it can be fabricated with great ease since grooves need to be formed on only one side. This embodiment has the additional advantage of forming an image with minimum blur since the Fresnel surface can be placed parallel to the display panel 1.

According to the embodiments of the projection type liquid-crystal video display device shown in FIGS. 6 to 19, the image formed by the illuminating light through the liquid-crystal display panel 1 is focused at a point in the vicinity of the entrance pupil of the projection lens 2. Therefore, if the effective aperture of the lens 2 is larger than the focused image, no "vignetting" of the illuminating light will occur and the formation of a bright image is ensured. In addition, the illuminating light transmitted through the display panel 1 is refracted toward a point perpendicular to the panel 1. The projection lens 2 is disposed on the extension of the line of refracted light, whereby the center of the display panel 1 is brought into agreement with the optical axis of the projection lens 2. Therefore, it suffices for the image circle of the projection lens 2 to be large enough to cover the effective picture size of the display panel 1.

FIGS. 20 to 27 show embodiments of a projection type liquid-crystal video display device which is based on the device shown in FIGS. 6 to 19 and which has a second optical element 4 disposed on the incident side of the liquid-crystal display panel 1 for the purpose of allowing illumination from a light source to fall on the display panel 1 in a direction substantially parallel to the inclination of the reorientation of the long axes of liquid-crystal molecules. This arrangement will improve the efficiency of light transmission through the display panel 1, thereby enabling a brighter image to be seen.

Figure 20:
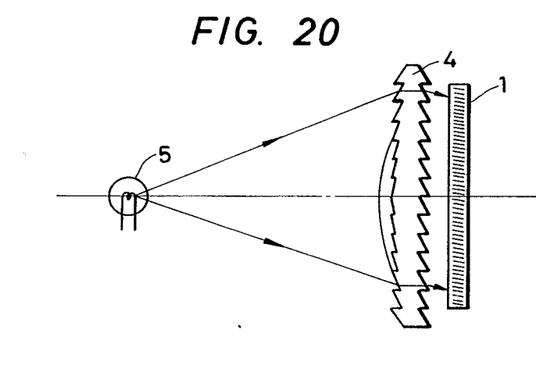
FIGS. 20 to 27 show other embodiments of the display device of the present invention wherein a second optical element is disposed on the entrance side of a liquid-crystal display panel, with FIG. 21 being a sectional view taken in the horizontal direction, FIG. 22 taken in the vertical direction, and FIGS. 20 and 23-27 being also taken in the vertical direction.

The second optical element 4 shown in FIG. 20 has a parallel, stepped prism surface and a circular Fresnel lens surface on its opposite sides, similar to the one shown in FIG. 6. In FIG. 20, the circular Fresnel lens surface is shown to be directed toward the light source 5 whereas the parallel, stepped prism surface is directed toward the display panel 1. Illumination from the light source 5 is made parallel by the circular Fresnel lens surface and is refracted by the stepped prism surface in a direction substantially parallel to the inclination of the reorientation of the long axes of liquid-crystal molecules before falling upon the display panel 1.

The circular Fresnel lens surface of FIG. 20 is typically fabricated with a spherical curve being used as the base but, in order to obtain highly parallel rays from the illuminating light, the Fresnel surface may be fabricated with a non-spherical curve being used as the base.

Figure 21:
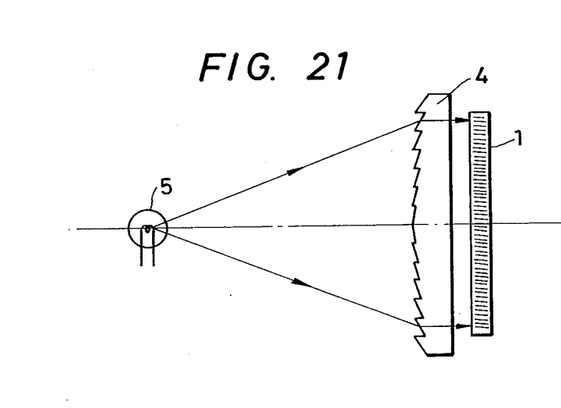
Figure 22:
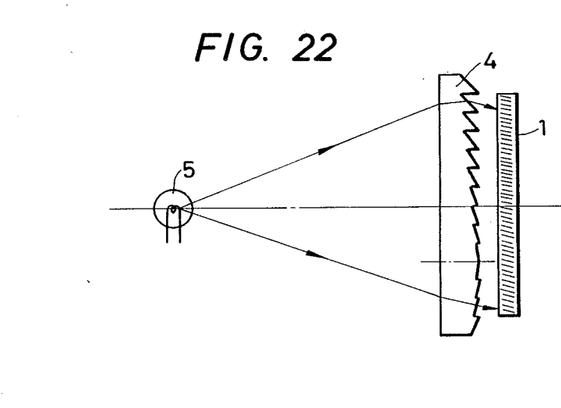

FIGS. 21 and 22 show an embodiment wherein an orthogonal or crossed linear Fresnel lens of the same type as shown in FIGS. 9 and 10 is used as the second optical element 4. The side of this optical element which faces the source of illuminating light 5 is formed as a noneccentric linear Fresnel lens surface as shown in FIG. 21 while the side facing the liquid-crystal display panel 1 is formed as an eccentric linear Fresnel lens surface which has refractive power in the vertical direction with respect to the display panel 1 as shown in FIG. 22. Illumination from the light source 5 is made substantially parallel in the horizontal direction by the non-eccentric linear Fresnel lens surface and falls upon the display panel 1 after being rendered substantially parallel in the vertical direction by the eccentric linear Fresnel lens surface and being refracted by the eccentric lens surface such that it is substantially parallel to the inclination of the reorientation of the long axes of liquid-crystal molecules.

As noted in connection with the embodiment shown in FIG. 20, the two Fresnel lens surfaces of FIGS. 21 and 22 may be fabricated with either a cylindrical or a non-cylindrical curve being used as the base.

Figure 23:
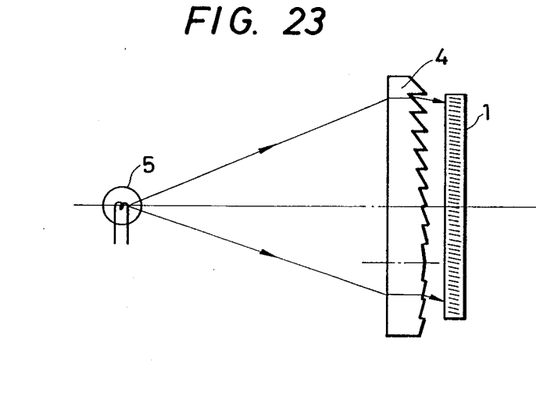

FIG. 23 shows an embodiment wherein an eccentric circular Fresnel lens of the same type as shown in FIG. 15 is used as the second optical element 4, with the eccentric circular Fresnel lens surface being directed toward the liquid-crystal display panel 1. Since the Fresnel lens is eccentric, illumination from the light source 5 which is disposed at an off-axis focus position of the Fresnel lens will fall upon the display panel 1 after being rendered substantially parallel by the eccentric circular Fresnel lens surface and being refracted by the same lens surface such that it is substantially parallel to the inclination of the reorientation of the long axes of liquid-crystal molecules. As noted in connection with the embodiment shown in FIG. 20, the eccentric circular Fresnel lens surface of FIG. 23 may be fabricated with either a spherical or non-spherical curve being used as the base.

Figure 24:
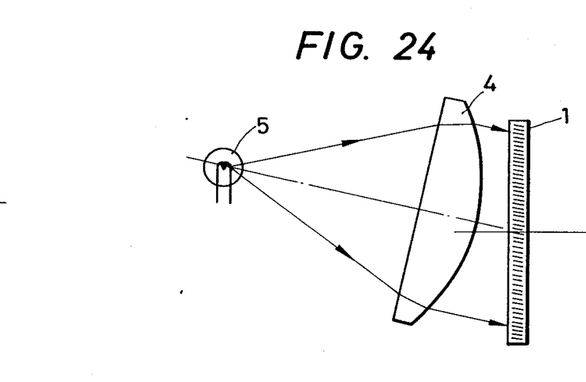

In the embodiment shown in FIG. 24, a collimation lens is used as the second optical element 4. The optical axis connecting the light source 5 and the center of the collimation lens 4 is shown to be substantially parallel to the inclination of the reorientation of the long axes of liquid-crystal molecules, so that illumination transmitted through the collimation lens will fall upon the display panel 1 in the form of rays that are substantially parallel to the inclination of the reorientation of the long axes of liquid-crystal molecules.

Figure 25:
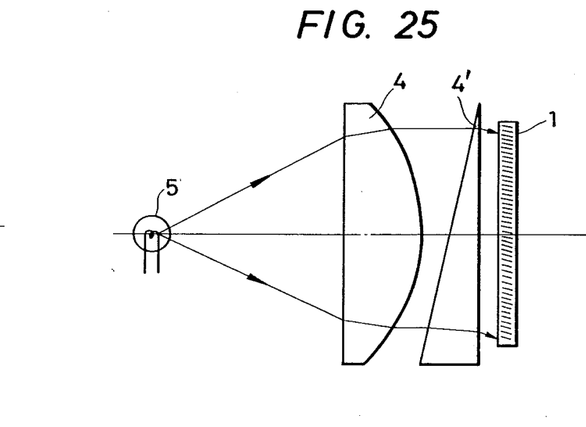

The second optical element used in the embodiment shown in FIG. 25 is composed of a collimation lens 4 and a wedge-shaped prism 4'. The optical axis connecting the light source 5 and the center of the collimation lens 4 is shown to be perpendicular to the liquid-crystal display panel 1 but, because of the wedgeshaped prism 4' which is disposed between the collimation lens 4 and the display panel 1, illumination from the light source 5 is made parallel by the collimation lens 4 and the resulting parallel rays will fall upon the display panel 1 after being refracted by the wedge-shaped prism 4' such that they are substantially parallel to the inclination of the reorientation of the long axes of liquid-crystal molecules.

Figure 26:
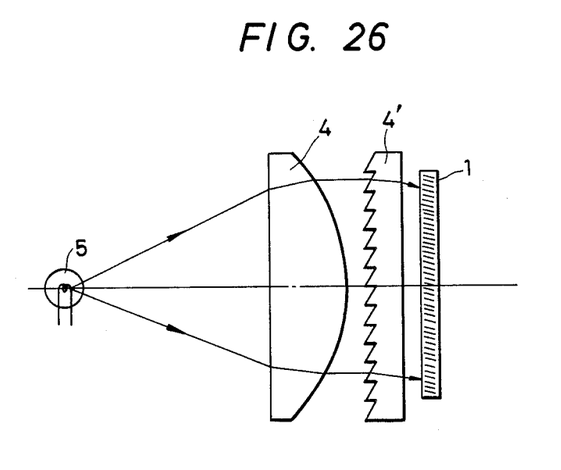
Figure 27:
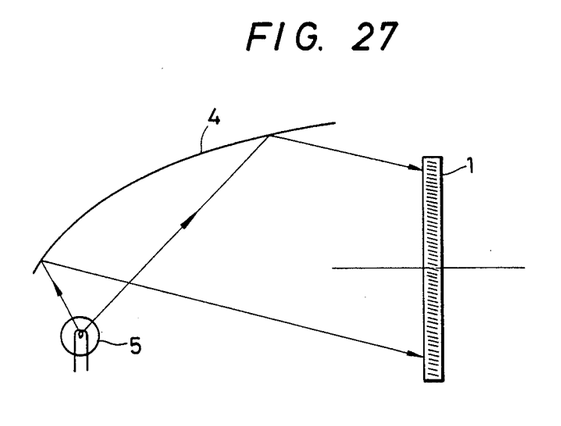

The second optical element used in the embodiment shown in FIG. 26 is composed of a collimation lens 4 and a stepped prism 4'. As in the embodiment shown in FIG. 23, the optical axis connecting the light source 5 and the center of the collimation lens 4 is shown to be perpendicular to the liquid-crystal display panel 1. However, because of the stepped prism 4' which is disposed between the collimation lens 4 and the display panel 1, illumination from the light source 5 is made parallel by the collimation lens 4. The resulting parallel rays will fall upon the display panel 1 after being refracted such that they are substantially parallel to the inclination of the reorientation of the long axes of liquid-crystal molecules.

As described above, in each of the embodiments of a projection type liquid-crystal video display device shown in FIGS. 20 to 27, a simple optical element is used to allow illuminating light to fall upon a liquid-crystal display panel at such an angle that it is substantially parallel to the long axes of the reoriented liquid-crystal molecules. The embodiments shown in FIGS. 18 to 21, wherein a Fresnel lens is used as the optical element on the illumination side, have the advantage that the overall size of the display device is reduced since the Fresnel lens can be fabricated such as to have a very small thickness. In addition, an inexpensive display device can be manufactured by coupling the Fresnel lens with the first optical element shown in each of FIG. 6 to 19.

As described in the foregoing pages, the projection type liquid-crystal video display device of the present invention employs one or two easily manufacturable and inexpensive optical elements, so that it permits the use of a projection lens of a narrow view angle with an aperture size of f/2.0 or f/2.8. This is accomplished by properly controlling the size of the light source which is used in combination with a liquid-crystal display panel or any other display elements through which light is transmitted in a viewing angle dependent manner. This enables the use of a compact projection lens system, which in turn leads to reductions in the size and cost of the overall display device The concept of the present invention may also be applied to a liquid-crystal color video display device using color filters Although the optical elements are separated from the color filters by the thickness of transparent electrode plates, the dark projection lens with a focal depth defined by such a large aperture ratio like f/2.0 or f/2.8 rather than f/1.0 and f/1.3 as mentioned before produce a sharp image while minimizing the loss in the quantity of light so that the viewer can have very easy access to the display.

What is claimed is:

1. A projection-type liquid-crystal video display device, comprising:
   an illuminating light source;
   a nematic liquid-crystal display panel for transmitting said illuminating light, a reorientation angle of axes of liquid crystals in said display panel being inclined at a predetermined angle with respect to electrodes when a voltage is applied to said display panel;
   a projection optical system for projecting said transmitted light onto a screen, said optical system having an entrance pupil; and
   an optical element disposed on an emergence side of said liquid crystal panel for refracting the light emitted obliquely relative to said liquid crystal display in accordance with said reorientation angle of said liquid crystals, to optically converge the light in close proximity of said entrance pupil of said optical system, said optical element having on at least one surface thereof of Fresnel lens having an optical axis offset from an optical axis of said optical system.

2. A display device as recited in claim 1, wherein said optical element comprises two crossed linear Fresnel lenses orthogonally oriented to each other, at least one of said Fresnel lenses being eccentric with respect to a center line.

3. A display device as recited in claim 2, wherein said eccentric linear Fresnel lens has a spherical base.

4. A display device as recited in claim 2, wherein said eccentric linear Fresnel lens has a non-spherical base.

5. A display device as recited in claim 1, wherein said optical element comprises a circular Fresnel lens being eccentric with respect to a center point.

6. A display device as recited in claim 5, wherein said eccentric circular Fresnel lens has a spherical base.

7. A display device as recited in claim 5, wherein said eccentric circular Fresnel lens has a non-spherical base.

8. A projection-type liquid-crystal video display device, comprising:
an illuminating light source;
a nematic liquid-crystal display panel for transmitting said illuminating light, a reorientation angle of axes of light crystals of said display panel being inclined at a predetermined angle with respect to electrodes when a voltage is applied to said display panel;
a projection optical system for projecting said transmitted light onto a screen, said optical system having an entrance pupil; and
an optical element disposed on an emergence side of said liquid crystal panel for refracting the light emitted obliquely relative to said liquid crystal display in accordance with said reorientation angle of said liquid crystals, to optically converge the light in close proximity of said entrance pupil of said optical system, said optical element having a circular Fresnel lens on one surface and a stepped prism with a saw-toothed cross-section on the other.

9. A display device as recited in claim 8, wherein said circular Fresnel lens has a spherical base.

10. A display device as recited in claim 8, wherein said circular Fresnel lens has a non-spherical base.

11. A projection-type liquid-crystal video display device, comprising:
an illuminating light source;
a nematic liquid-crystal display panel for transmitting said illuminating light, a reorientation angle of axes of liquid crystals of said display panel being inclined at a predetermined angle with respect to electrodes when a voltage is applied to said display panel;
a projection optical system for projecting said transmitted light onto a screen, said optical system having an entrance pupil;
a first optical element disposed adjacent on an emergence side of said liquid crystal panel for refracting the light emitted obliquely relative to said liquid crystal display in accordance with said reorientation angle of said liquid crystals, to optically converge the light in close proximity of said entrance pupil of said optical system, said optical element having on at least one surface thereof a Fresnel lens having an optical axis offset from an optical axis of said optical system; and
a second optical element disposed on incident side of said liquid crystal panel for introducing the light, emitted from said illuminating light source, into said crystal display panel substantially in parallel with the reorientation angle of axes of the liquid crystals.

12. A display device as recited in claim 11, wherein said second optical element comprises a collimation lens having an optical axis inclined with respect to said display panel.

13. A display device as recited in claim 11, wherein said second optical element comprises a collimation lens and a stepped prism having a saw-toothed cross-section.

14. A display device as recited in claim 11, wherein said second optical element comprises a circular Fresnel lens and a stepped prism having a saw-toothed cross-section.

15. A display device as recited in claim 11, wherein said second optical element comprises a collimation lens and prism.

16. A display device as recited in claim 14, wherein said circular Fresnel lens has a spherical base.

17. A display device as recited in claim 14, wherein said circular Fresnel lens has a non-spherical base.

18. A display device as recited in claim 11, wherein said second optical element comprises two crossed linear Fresnel lenses orthogonally oriented to each other, at least one of said linear Fresnel lens being eccentric with respect to a center line.

19. A display device as recited in claim 18, wherein said eccentric linear Fresnel lens has a spherical base.

20. A display device as recited in claim 18, wherein said eccentric linear Fresnel lens has a non-spherical base.

21. A display device as recited in claim 18, wherein said second optical element comprises a circular Fresnel lens eccentric with respect to a center.

22. A display device as recited in claim 21, wherein said eccentric circular Fresnel lens has a spherical base.

23. A display device as recited in claim 21, wherein said eccentric circular Fresnel lens has a non-spherical base.

24. A display device as recited in claim 11, wherein said second optical element comprising an off-axis mirror facing said source of illuminating light for reflecting light at a inclined angle toward said display panel.

25. A projection-type liquid-crystal video display device, comprising:
an illuminating light source;
a nematic liquid-crystal display panel for transmitting said illuminating light, a reorientation angle of axes of liquid crystals in said display panel being inclined at a predetermined angle with respect to electrodes when a voltage is applied to said display panel;
a projection optical system for projecting said transmitted light onto a screen, said optical system having an entrance pupil;
a first optical element disposed on an emergence side of said liquid crystal panel for refracting the light emitted obliquely relative to said liquid crystal display in accordance with said reorientation angle of said liquid crystals, to optically converge the light in close proximity of said entrance pupil of said optical system, said optical element having a circular Fresnel lens on one surface and a stepped prism with a saw-toothed cross-section on the other; and
a second optical element disposed on incident side of said liquid crystal panel for introducing the light, emitted from said illuminating light source, into said crystal display panel substantially in parallel with the reorientation angle of axes of the liquid crystals.

* * * * *